US009633112B2

(12) United States Patent
Andreasen et al.

(10) Patent No.: US 9,633,112 B2
(45) Date of Patent: Apr. 25, 2017

(54) METHOD OF RETRIEVING ATTRIBUTES FROM AT LEAST TWO DATA SOURCES

(71) Applicant: Kapow Software

(72) Inventors: Stefan Andreasen, Espergaerde (DK); Morten Helles, Gentofte (DK)

(73) Assignee: Kapow Software, Palo Alto, CA (US)

( * ) Notice: Subject to any disclaimer, the term of this patent is extended or adjusted under 35 U.S.C. 154(b) by 236 days.

(21) Appl. No.: 13/946,684

(22) Filed: Jul. 19, 2013

(65) Prior Publication Data

US 2014/0040223 A1 Feb. 6, 2014

Related U.S. Application Data

(63) Continuation of application No. 10/240,463, filed as application No. PCT/DK00/00163 on Mar. 31, 2000, now abandoned.

(51) Int. Cl.
*G06F 17/30* (2006.01)

(52) U.S. Cl.
CPC .. *G06F 17/30861* (2013.01); *G06F 17/30864* (2013.01)

(58) Field of Classification Search
CPC ............... G06F 17/30861; G06F 17/30864
USPC ............ 707/734, 705, 706, 724, 748
See application file for complete search history.

(56) References Cited

U.S. PATENT DOCUMENTS 5,924,090 A    7/1999  Krellenstein
5,999,940 A *  12/1999 Ranger ................ 707/734
6,005,565 A    12/1999 Legall et al.
6,006,224 A    12/1999 McComb et al.
6,300,947 B1   10/2001 Kanevsky
(Continued)

FOREIGN PATENT DOCUMENTS

EP    0964341 A2    12/1999
WO    96/23265      8/1996
WO    98/32289      7/1998

OTHER PUBLICATIONS

Hsinchun Chen et al., "Intelligent Spider for Internet Searching", IEEE, 1997, pp. 178-187.
(Continued)

*Primary Examiner* — Thuy Pardo
(74) *Attorney, Agent, or Firm* — Zilka-Kotab, P. C.

(57) ABSTRACT

Systems, methods, and computer program products configured to collect attributes (A) from a plurality of potentially-incompatible data sources (DS), and synthesize collected attributes into a streamlined, elegant presentation e.g. for further data processing and/or review by a user are presented. The inventive concepts include accessing the data source(s); identifying a number of attributes of the data source(s); associating at least two attributes to a set of associated attributes; and storing a retrieving profile (RP) according to which attributes of the data sources may be subsequently retrieved. In more approaches, data source(s) may be accessed using a retrieving profile, and the retrieving profile is configured to access desired content thereof. In even more approaches, the retrieving profile may be further configured to automatically access a particular expected data structure (EDS) of the data source. The expected data structure may reflect a previous structure of the data source as recently accessed.

48 Claims, 8 Drawing Sheets

(56) References Cited

U.S. PATENT DOCUMENTS

| | | | |
|---|---|---|---|
| 6,301,707 B1* | 10/2001 | Carroll et al. | 717/177 |
| 6,424,980 B1 | 7/2002 | Iizuka et al. | |
| 6,430,624 B1 | 8/2002 | Jamtgaard et al. | |
| 6,463,462 B1 | 10/2002 | Smith et al. | |
| 6,812,941 B1 | 11/2004 | Brown et al. | |
| 6,920,488 B1 | 7/2005 | Le Pennec et al. | |
| 6,976,210 B1 | 12/2005 | Silva et al. | |
| 7,103,838 B1 | 9/2006 | Krishnamurthy et al. | |
| 2002/0016828 A1 | 2/2002 | Daugherty et al. | |
| 2002/0103809 A1* | 8/2002 | Starzl | G06F 17/30864 |
| 2002/0107848 A1* | 8/2002 | Brown | G06F 17/3061 |
| 2003/0050860 A1 | 3/2003 | Janakiraman et al. | |
| 2003/0121983 A1 | 7/2003 | Herle | |
| 2003/0149684 A1* | 8/2003 | Brown | G06F 17/3061 |
| 2003/0233404 A1 | 12/2003 | Hopkins | |
| 2004/0110490 A1 | 6/2004 | Steele et al. | |
| 2004/0177148 A1 | 9/2004 | Tsimelzon, Jr. | |
| 2004/0193636 A1* | 9/2004 | Black | G06F 17/30864 |
| 2006/0085731 A1 | 4/2006 | Cui et al. | |
| 2006/0277460 A1 | 12/2006 | Forstall et al. | |
| 2007/0061707 A1 | 3/2007 | Sally et al. | |
| 2007/0106952 A1 | 5/2007 | Matas et al. | |
| 2009/0055727 A1 | 2/2009 | Hansen et al. | |
| 2009/0265420 A1 | 10/2009 | Hansen et al. | |

OTHER PUBLICATIONS

International Search Report; PCT/DK00/00163; Feb. 21, 2001; 5 pgs.
Hansen et al., U.S. Appl. No. 12/301,075, filed Feb. 17, 2009.
Non-Final Office Action from U.S. Appl. No. 12/301,075, dated May 12, 2011.
Final Office Action from U.S. Appl. No. 12/301,075, dated Mar. 30, 2012.
Non-Final Office Action from U.S. Appl. No. 12/301,075, dated Nov. 26, 2012.
Hansen et al., U.S. Appl. No. 12/094,233, filed Sep. 11, 2008.
Non-Final Office Action from U.S. Appl. No. 12/094,233, dated Jun. 17, 2011.
Final Office Action from U.S. Appl. No. 12/094,233, dated Jan. 11, 2012.
Non-Final Office Action from U.S. Appl. No. 12/094,233, dated May 9, 2014.
Final Office Action from U.S. Appl. No. 12/094,233, dated Dec. 4, 2014.
Helles et al., U.S. Appl. No. 10/240,463, filed Feb. 3, 2003.
Restriction/Election Requirement from U.S. Appl. No. 10/240,463, dated Aug. 17, 2005.
Non-Final Office Action from U.S. Appl. No. 10/240,463, dated Mar. 8, 2006.
Final Office Action from U.S. Appl. No. 10/240,463, dated Dec. 12, 2006.
Advisory Action from U.S. Appl. No. 10/240,463, dated Jun. 26, 2007.
Non-Final Office Action from U.S. Appl. No. 10/240,463, dated Apr. 15, 2008.
Examiner's Answer to Appeal Brief from U.S. Appl. No. 10/240,463, dated Apr. 27, 2010.
Patent Board Decision from U.S. Appl. No. 10/240,463, dated May 28, 2013.
International Preliminary Examination Report from International Application No. PCT/DK06/00262, dated Nov. 17, 2008.
International Search Report and Written Opinion from International Application No. PCT/DK06/00262, dated Mar. 15, 2007.
International Preliminary Examination Report from International Application No. PCT/DK05/00738, dated May 20, 2008.
International Search Report and Written Opinion from International Application No. PCT/DK05/00738, dated Apr. 6, 2006.
Examination Report from EP Application No. 05803995.9, dated Jan. 11, 2010.
International Preliminary Examination Report from International Application No. PCT/DK00/00163, dated Jun. 4, 2002.
Examination Report from EP Application No. 00914064.1, dated Apr. 15, 2008.
Examination Report from EP Application No. 00914064.1, dated Jul. 26, 2012.
Britton et al., "Transcoding: Extending E-Business to New Environments," IBM Systems Journal, vol. 40, No. 1, Sep. 17, 2001, pp. 153-178.
Butler, M. "Current Technologies for Device Independence," Publishing Systems and Solutions Laboratory, HPL-2001-83, Apr. 4, 2001, pp. 1-28.
Dewitt et al., "Advanced Web Clipping Using WebSphere Portal Versions 4.1," IBM, Oct. 23, 2002, pp. 1-14.
Ihde et al., "Intermediary-Based Transcoding Framework," IBM Systems Journal, vol. 40, No. 1, 2001, pp. 179-192.
List of Common TCP/IP Port Numbers, AnswersThatWork, Sep. 27, 2008, pp. 2, 5.
Examination Report from European Application No. 00914064.1, dated Jul. 24, 2015.

* cited by examiner

| Model | Km | Price |
|-------|------|-------|
| Audi | 1000 | 5600 |
| Ford | 2300 | 12345 |

```
<TABLE>
   <TR>
      <TD>Model</TD>    <TD>Km</TD>       <TD>Price</TD>
   </TR>
   <TR>
      <TD>Audi</TD>     <TD>1000</TD>     <TD>5600</TD>
   </TR>
   <TR>
      <TD>Ford</TD>     <TD>2300</TD>     <TD>12345</TD>
   </TR>
</TABLE>
```

METHOD OF RETRIEVING ATTRIBUTES FROM AT LEAST TWO DATA SOURCES

CROSS-REFERENCE TO RELATED APPLICATIONS

This application is a Continuation Application of U.S. Non-Provisional application Ser. No. 10/240,463 filed Feb. 2, 2003, which claims priority to PCT Application No. PCT/DK00/00136 filed Mar. 31, 2000, the disclosures of which are incorporated by reference herein in their entireties.

FIELD OF THE INVENTION

The invention relates a method of retrieving attributes from at least two data sources (DS) according to claims 1 and 2, a method of establishing a knowledge base according to claim 24 and a market place web-site according to claim 25.

BACKGROUND OF THE INVENTION

The World Wide Web (WWW) is an enormous and ever growing source of information on the Internet, supplied and used by companies, organizations and private persons.

Most pages on the WWW are based on documents written in HTML (Hypertext Markup Language) or XML (Extensible Markup Language). HTML and XML are both subsets of SGML (Standard Generalized Markup Language). SGML is not a programming language, but rather a text processing standard describing the layout as well as the contents of the documents.

An increasing number of companies is in the business of collecting information from a large number of web sites and presenting this information (often formatted to a common layout) on a single web site.

In order to collect information from web sites constructed in many different ways, these companies have to design specific programs ("robots") for each web site to decode the HTML (or XML) documents and extract the desired information (e.g. model, mileage and price for a number of used cars for sale). The implementation of these robots is both tedious and very time-consuming while also requiring skilled programmers, preferably using the Java programming language.

A further problem related to the existing generation of robots is that the data sources may typically comprise at least two data sources having time-varying data formats. A problem with the data sources having time varying formats is that automated interpretation processing becomes extremely complex and time-consuming in order to obtain the desired information. Even when applying artificial intelligence, the obtained results should be compared with the efforts made in order to obtain the desired result.

U.S. Pat. No. 5,999,940 discloses a web based marketplace comprising a search facility for a more or less direct accessing to different data sources. Market places of the described kind may offer a search in a huge material through which, only one search profile established at the market place may address information stored in several different data sources. A problem of the disclosed invention is that the offered information is restricted to uniquely identified items, i.e. items which may be described and identified completely by a unique ID-number or at least has to follow one specific syntax known and accepted by both the data source owner and the programmer of the search robot. In other words, only items having a common ID-key may be offered at the market place due to the fact that the market place may only access information at other data sources if there is a common understanding of the representation needed for identifying the individual items.

The disclosed invention of U.S. Pat. No. 5,999,940 deals specifically with the requirements to the data source and the querying server, so as to define the information which may be accessed by the querying and which information to be hidden to the query.

In other words, dependencies exist between the market place provider and the data source owner, as a roboting of the data source requires that the data structure of the data source fits to the robot or agent roboting the individual data source. Obviously, such requirement restricts the groupings of data which may be accessed significantly as data source owners not necessarily are aware of such unique ID's, if such ID's are existing at all.

One of the objects of the invention is to provide a search strategy that improves the search possibilities for the customers and increases the availability of data in case of break-downs or other failures on some of the web sites providing the data.

Another object is to provide a method and a tool to build and implement robots like the ones mentioned above in a much faster way than usual by using a graphical user interface to create a series of individually configured steps of action without having to code one single line of Java.

SUMMARY OF THE INVENTION

The invention relates to a method of retrieving attributes from at least two data sources (DS) by
  accessing the data source(s) (DS)
  identifying a number of attributes (A) of said data source(s) (DS),
  associating at least two attributes to a set of associated attributes (ASA),
  storing a retrieving profile (RP), according to which attributes (A) of the data sources may be retrieved.

According to the invention, multiple data sources may be accessed by users having limited resources, such as time and money, as access may be established by means of a simple query, which may subsequently be effected by means of the stored retrieving profile.

The assignment may be implemented in various ways as the different attributes may be presented according to many different presentation templates ranging from highly structured relational databases to poorly structured text-based documents.

The invention deals with entities in the sense that the entities are identified according to properties of the associated attributes and not only to a distinct searchable attribute such as a social security number or an ISBN-number. Hence, according to the invention, the ISBN-number of a book may relate to several different books of the same kind being sold at different prices.

When registering and storing a profile determining the position of groups of entities and/or attributes in a specific data source, easy and fast access to information of that source has been facilitated. It should be noted that easy access may be facilitated irrespective of whether a specific query on the data source is made or whether the data source is accessed and read in its entirety. The retrieving profile may contain information determining the allocation of different kinds of information on the site in question.

According to an aspect of the invention, the different attributes of the entity may comprise associated information. For instance, a car model attribute of e.g. 100 CD 2.3E may be determined as a car having a 2.3 liter engine.

A feature of the invention is that attributes may be combined into a unique entity comprising the mentioned attributes. It should be noted that such information may sometimes be difficult to access when dealing with more or less chaotic and non-informative attributes.

A data source may e.g. be a web-site, a database, excel documents or a flat text file.

The data sources may typically comprise at least one data source having time-varying data formats. A problem with the data sources having time varying formats is that automated interpretation processing becomes extremely complex and time-consuming in order to obtain the desired information.

An attribute is an information carrying structure such as car model, engine size, etc. which may partially be described as a certain object.

The manner in which associated attributes are determined may vary significantly from data source to data source due to the allowed incompatible data-format of the data sources. According to some applications, the associated attributes may be determined by analyzing the XML, WML or VRML, or preferably HTML table contents of a web-server. Evidently, other structures or languages may be analyzed within the scope of the invention. When dealing directly with the data structure, the associated attributes become easier to analyze and identify.

It should be noted that the mere identification of attributes may provide a sufficient amount of information so that other attributes may subsequently be retrieved from the respective data sources, even though the originally identified attributes have been changed or removed from the data source, due to the fact that a retrieving profile may not only identify the individual attributes, but also the general attribute structure of the individual site.

Moreover, it should be noted that a set or sets of associated attributes may be accessed and retrieved by a search for only one attribute.

Moreover, is should be noted that data sources fulfilling a certain syntax may be added to the system, even though a method or system according to the invention basically involves independent data sources with any syntax. This situation would typically arise when owners of data sources actively ask for a roboting of their data source. Such a request would preferably involve some requirements with respect to syntax in order to enable a simple and fast establishment of a robot for the specific data source. An example of a syntax would e.g. be that the data source owner applied certain meta tags in the coding of the data source in order to facilitate easy recognition of the data within the data source of the associated robot.

Moreover, the invention relates to a method of retrieving attributes from at least one or two data sources (DS) by
 accessing a retrieving profile (RP) according to which attributes of the data sources (DS) may be retrieved
 accessing the data source(s) (DS) on the basis of the retrieving profile (RP)
 identifying a number of attributes (A),
 associating/assigning at least two attributes to a set of associated attributes (ASA),
 if the predefined conditions are met, storing a new retrieving profile (RP) according to which attributes of the data sources may be retrieved.

A typical predefined condition invoking storage of a new retrieving profile may be the data source having changed in such a way that a new retrieving profile is necessary for retrieving data from the data source. Other predefined conditions may e.g. simply specify that a new retrieving profile be established every time data from a data source is retrieved. Further examples of predefined conditions may e.g. be if the retrieving profile needs to be enhanced or simply refined a little.

Generally, according to the invention, a user may extract data from a huge amount of data sources directly or indirectly via the retrieving profiles of the data sources. Direct access to the data sources may e.g. be understood as direct access to organized data contained in or controlled by the retrieving profile. Indirect access may be understood as a search of different data sources "guided" by the retrieving profile in such a way that the search or retrieval is easier and/or quicker than a manual search of each data source.

It should be noted that the invention offers the possibility of dealing with second hand items and even combinations of second-hand items and new comparable items.

Other possible items would e.g. be news, stocks, odds, etc.

When, as stated in claim 3, said retrieving profile comprises a search profile (SP) according to which attributes may be accessed, a further advantageous embodiment of the invention has been obtained.

A search profile may e.g. comprise structural information about a data source identifying the way specific types of attributes may be accessed directly. Accordingly, a data source may be accessed according to a query and data may subsequently be retrieved not only according to the exact allocation of a certain attribute or entity, but also according to the type of attribute or entity. Hence, the retrieving profile may point to certain categories of entities in such a way that "the picture" of the data source contained in the search profile may be sustained even if new entities are added or old entities removed due to the fact that the search profile may address groupings/types of attributes or entities rather than specific attributes or entities.

An example of such search profile may e.g. be information determining that certain type of attributes, e.g. a car model, may be found in a certain table of a data structure. Such search profile may be sustained even if the number of rows, i.e. entities vary and data may be retrieved accordingly without any confusion due to a new entity replacing an old entity.

Hence, unnecessary and time-consuming searching of the data source(s) may be avoided according to the present embodiment of the invention.

When, as stated in claim 4, at least two of the said attributes (A) of the sets of associated attributes (ASA) are categorized as categorized attributes (CA), a further advantageous embodiment of the invention has been obtained.

An example of a categorized attribute may e.g. be an attribute "Bugatti" which is interpreted to be a car model.

The categorization may e.g. be performed on the basis of the organization of the contents of neighboring attributes. When dealing with categorized attributes, information of different sites may be brought in conformity and into one single format. This conformity may imply both removal of the retrieved attributes and addition of associated attributes to the set of already established and associated attributes.

The added information may e.g. be different car characteristics deduced on basis of a car model attribute of an entity of associated attributes. Hence, information not present on the visited data site may be added centrally.

It should be noted that the categorization of attributes may be advantageously performed simultaneously with the assignment of associated attributes as an interpretation of different attributes, such as "Ferrari, Trabant and VW" as car models, may facilitate the assignment of different cars for sale into different entities due to the fact that the three different car models may easily be interpreted as separate entities and not one entity comprising the three different car models. Evidently, the categorization may be performed at later stages or whenever appropriate.

When, as stated in claim 5, said retrieved associated set of attributes (ASA) is displayed by a central window means (CW), a further advantageous embodiment of the invention has been obtained.

A central window means may e.g. comprise a web-site or client software by means of which the retrieved data may be searched for and accessed. WAP technology may likewise be applicable.

When facilitating access to many different data sources via one common access key, the user may gain instantaneous knowledge to a certain query.

When, as stated in claim 6,
each associated set of attributes (ASA) forming an entity (E)
assigning an entity identifier (EID) to at least one, preferably all, associated sets of attributes (ASA), a preferred embodiment of the invention has been obtained.

Accordingly, the attributes of a determined entity may be monitored and changes of the individual attributes detected. Consequently, small changes of the attributes may infer an initial check of whether the assumed entity has been replaced by another entity. If, for instance, the examination reveals that the assumed entity has been replaced by a new entity, the entity identifier has to be replaced, too. However, if the examination reveals that the determined entity is still the same, the modified attributes or entities may be examined and high-lighted on the market-place. A typical modification of an attribute of one unique and identified entity is a change in price, km., etc. Such changes may for instance infer a flag on the market place indicating that a car has e.g. changed price. Other interesting features of that kind would be in relation to changes in odds, stocks or the like.

When, as stated in claim 7, at least two of the said data sources (DS) are independent and have different data formats/retrieving profiles (RP), a further advantageous embodiment of the invention has been obtained.

Again, a data source may e.g. be a web-site, a database, excel documents or a flat text file.

When, as stated in claim 8, said retrieving profile (RP) determines a data storage allocation structure (SAS) according to which entities may be retrieved, a further advantageous embodiment of the invention has been obtained.

If a data allocation structure is determined, changes in the attributes of the entities may be recorded, and even more importantly, new entities may easily be registered due to the fact that the types and the association of the read attributes may easily be identified by the data storage allocation structure. An example of such a structure may e.g. be accessing data in a predetermined table of a web-site in which e.g. column one determines attributes of a car model, column two determines the engine size, column three determines a model year and column four determines the price. Each row of the two-dimensional tables constitutes a predefined entity of associated attributes and consequently, the interpretation of the read data is made easier due to the fact that the data structure is assumed to be identical with the structure used the last time the data source was accessed.

For instance, the number of entities at one site may vary from time to time. Nevertheless, the data storage allocation structure may be preserved. Thus, even if the number of entities is reduced from e.g. five to four, the data storage allocation structure would still be described as a structure having a number of columns and a number of rows.

A data storage allocation structure may e.g. consist of tables in the HTML language.

When, as stated in claim 9, the read attributes and/or the entities are verified subsequent to the reading and the establishment of associated attributes, a further advantageous embodiment of the invention has been obtained.

Evidently, according to the invention, obtained data may be checked by applying different types of interpretation methods. Among many types of verifications, a read attribute (or a set of attributes if part of the same category) may e.g. be examined to determine whether the attribute category is correct or false. Another verification would e.g. be checking whether the assumed price is actually at a reasonable level. If not, the check may suggest that the assumed price attribute is perhaps in another category due to a change of structure of the data source which has been made subsequent to the last visit to the data source.

On the other hand, automatic fault corrections may be implemented if the read attribute is obviously mistyped in a certain way. A correction of a possible mistake made by the programmer of the data source may subsequently be indicated to the user.

Another check may e.g. be in relation to text recognition of one or several attributes assumed to be car models.

Such checks may be made on a real-time basis, i.e. during reading and/or subsequent to the retrieving process.

If faults are detected which cannot be corrected automatically, such faults will cause further retrieval processes of the data source to take place.

The verification may be supplemented by a classification meaning that information is added to a specific entity on the basis of a knowledge base. Such adding of information may be contained in the retrieving profile itself, or directly in the central database.

The above-mentioned addition of information improves the quality of the retrievable entities as one entity may be searched according to the added information in conjunction with other entities already presented on the same or other data sources as entities comprising the added information.

Added information would typically be an attribute added to a certain entity.

An example of an added attribute would e.g. be a certain car entity described at a data source comprising the associated attributes car: "Perpetum Mobile", model:"007 super deluxe", price:"$100,000". When comparing those attributes with a knowledge base, the trunk of the specific car is deduced to have a certain volume and the number of cylinders is deduced at a specific number which may be added to the central database or to the retrieving profile. Consequently, the car in question may be searched for on the basis of certain criteria not present on the data source.

When, as stated in claim 10, said associated sets of attributes (ASA) and/or entities are stored in a (central) database means (DB) according to certain predetermined storing criteria, a further advantageous embodiment of the invention has been obtained.

If, for instance, some of the data sources are temporarily out of order, the user may search every entity or almost every entity of the data source anyway. In this way, the central database means offers central extracting and search possibilities in different entities and their associated attributes despite local break-downs. Of course, it should be noted that the presented data may sometimes be outdated, but the method usually provides reliable data according to the invention.

It should be noted that break-downs of data-sources are quite common when dealing with Internet sites and that such breakdowns would be quite annoying if no data was available for search or presentation purposes on the site. The invention facilitates high quality estimates of data sources even during temporary break-downs.

The database may be considered a kind of cache containing data, which are in fact not real-time, but as close to real time as possible.

When, as stated in claim 11, the database means (DB) comprises searchable attributes and/or entities, said attributes and/or entities being stored in said central database means associated with data sources (DS) from which the attributes and/or entities have been retrieved, a further advantageous embodiment of the invention has been obtained.

If, for instance, a user searches the central database for certain attributes, the entity corresponding to the found attribute may be presented to the user together with a link to the data source in such a way that the user may access the entity by using the original data source directly or indirectly.

Hence, only selected information (typically information contained in the database) may initially be presented to the user, and the user may subsequently access e.g. picture information on the data source itself, if further information is desired.

When, as stated in claim 12, said display of said retrieved associated set of attributes (ASA) in a central window means (CW) is maintained until a new retrieved associated set of attributes has been verified, a further advantageous embodiment of the invention has been obtained.

When, as stated in claim 13, access to the individual data source(s) (DS) is initiated on the basis of pre-established trigger rules (TR), a further advantageous embodiment of the invention has been obtained.

According to the above-mentioned embodiment of the invention, access to the individual data sources may be controlled intelligently and optimally with respect to obtaining access to the data sources with e.g. minimum delay, minimized inconvenience to the owner of the data source, a high refresh rate of the data sources providing the highest number of entities from a statistical point of view.

It should be emphasized that different types of trigger rules may conveniently be combined in several different ways within the scope of the invention.

When, as stated in claim 14, said trigger rules (TR) determine the frequency of accessing at least one of the data sources (DS) at a time interval (TI), a further advantageous embodiment of the invention has been obtained.

Examples of such trigger rules may e.g. be the time of day when the individual data sources are accessed, thereby obtaining a minimum of inconvenience to the owner of e.g. a web-site.

When, as stated in claim 15, said trigger rules (TR) determine the frequency of accessing at least one of the data sources (DS) on the basis of user queries, a further advantageous embodiment of the invention has been obtained.

When, as stated in claim 16, said trigger rules (TR) determine the frequency of accessing at least one of the data sources (DS) on the basis of statistics of the specific data source (DS), a further advantageous embodiment of the invention has been obtained.

When, as stated in claim 17, said trigger rules (TR) determine that access to at least one of the data sources (DS) may be made upon request by the data source or the owner of the data source, a further advantageous embodiment of the invention has been obtained.

According to the invention, accessing a data source or some data sources may be advantageously trigged by the data source once it has been updated. Evidently, this "access-pushing" may decrease the load on the system significantly due to the fact that information will only be updated upon request.

When, as stated in claim 18, said database means (DB) comprises manual input means (MIM) established in order to allow for manual inputs of entities into the database means (DB), a further advantageous embodiment of the invention has been obtained.

When combining a robot served market place with the possibility of letting users introduce input entities manually into the database, a central database may be obtained by which single users may enter only one entity in an environment with several other items of similar nature. Hence, according to the invention, a market place may be applied both for business advertising and advertising of a more private nature.

According to the present embodiment, the huge amount of information obtained by the automated robots or engines may be supplemented by individual subscribers. Hence, the market place offers the possibility of exposing single entities in large market places.

When, as stated in claim 19, a user (U) may access the said at least two data sources (DS) via the said retrieving profile (RP), a further advantageous embodiment of the invention has been obtained.

When, as stated in claim 20, the user (U) may access the said data sources (DS) via the central database means by means of the said retrieving profile (RP), a further advantageous embodiment of the invention has been obtained.

When, as stated in claim 21, the user may access the said data sources (DS) directly via the search profile (SP), a further advantageous embodiment of the invention has been obtained.

When, as stated in claim 22, a user (U) may access the data sources via a user query form (UQF), said user query form comprising at least two input query entries (IQE1; IQE2; IQE3), a further advantageous embodiment of the invention has been obtained.

When, as stated in claim 23, a mail-back message ( ) is forwarded to a subscriber (S) if certain entities match a subscriber's request ( ) a further advantageous embodiment of the invention has been obtained.

According to the invention, numerous options for combining mail-back requests may be established. An example of such request would e.g. be a request defining a car model and a certain year or interval of years combined with a certain price interval, typically a price less than a certain amount.

Consequently, the subscriber may obtain the desired information without performing a daily search of several different data sources.

Again, the facilitated mail-back service improves the possibility of dealing with e.g. second hand cars, stocks, news or the like.

Moreover, the invention relates to a method of establishing a knowledge base ( ) according to claim 25, said knowledge base defining a number of relationships between attributes, said method comprising the steps of accessing a number of data sources ( ) identifying a number of attributes, establishing a number of relationships between the said attributes and storing said established number of relationships between the said attributes.

A feature of a knowledge base according to the invention is that the knowledge base may ease the identification of attributes when data sources are visited in order to obtain information about specific entities e.g. offered for sale.

An example of such a process may be a knowledge base comprising comprehensive information about different car models, typical price, etc. The knowledge base may be established by visiting a lot of data sources, or selected data sources having the necessary desired quality, and then organizing the obtained knowledge in such a way that the system may identify an attribute "Ford" as a car model. Evidently, high detail levels may be obtained. Other examples of the contents of such a knowledge base may be an average price of a certain car having a certain kind of equipment and a certain year. Such information may e.g. be significantly refined by an identification process where a certain number of attributes identified as an entity may be checked and verified to ensure that the price of a car corresponds to that which is typical of that type of entity. Evidently. the identification process itself may be refined.

Moreover, the invention relates to a marketplace web site, as stated in claim 25, comprising an input query form or syntax, said form or syntax comprising a number of input query types, preferably including intervals and number, said web site communicating with at least two independent data web-sites and/or databases and said marketplace web-site comprising means for mapping a query established by means of said input query form or syntax into a number of sub-queries, at least two of the sub-queries being adapted to access of information from at least two corresponding independent web-sites.

Moreover, the invention relates to a method of establishing a knowledge base according to claim 25, said knowledge base defining a number of relationships between attributes, said method comprising the steps of accessing a number of data sources, identifying a number of attributes, establishing a number of relationships between said attributes and storing said established number of relationships between the attributes.

Moreover, the invention relates to a data source robot according to claim 26, preferably a web robot, comprising data processing means for automatically accessing the contents of a data source (DS) according to a retrieving profile (RP) said retrieving profile being adapted to accessing an expected data structure (EDS) of the data source (DS), said expected data structure (EDS) representing the data structure of the data source as defined during recent automatic accesses made to the source by the data source robot.

When, as stated in claim 27, said expected data structure is subsequently stored in a retrieving profile (RP) in accordance with predefined storing criteria, a further advantageous embodiment of the invention has been obtained.

When, as stated in claim 28, said expected data structure (EDS) being the data structure of the data source (DS) the last time the data source was accessed, a further advantageous embodiment of the invention has been obtained.

When, as stated in claim 29, said system comprises a number of said robots, at least one of said robots being adapted to accessing a corresponding data source having an unknown data structure, said access being established according to a retrieving profile (RP), said retrieving profile (RP) comprising at least one expected data structure (EDS) of said data source which may match the actual data structure of the data source (DS), a further advantageous embodiment of the invention has been obtained.

When, as stated in claim 30, said retrieving profile (RP) comprises a plurality of expected data structures (EDS), each structure corresponding to a specific data source, a further advantageous embodiment of the invention has been obtained.

When, as stated in claim 31, said system comprising at least one database (DB), said system comprising means for storing data retrieved from a plurality of said data sources (DS) according to predetermined storing rules, a further advantageous embodiment of the invention has been obtained.

When, as stated in claim 32, said system comprises means for facilitating access to at least two of said data sources (DS) or said database (DB) by means of a common query form or query syntax, a further advantageous embodiment of the invention has been obtained.

Moreover, the invention relates to a method of retrieving entities from a data source (DS) according to claim 33 by means of a local query form, said method comprising the steps of entering an initial combination of query entries ( ), identifying the number of the results ( ) invoked by the said combination of query entries, if the number of results ( ) invoked by the said combination of query entries is greater than a maximum number of results (MRL), manipulating the said combination of query entries in such a way that the result of the said initial combination of query entries may be aggregated by means of sub-result lists ( ), each sub-result list ( ) being established by a sub-combination of said initial combination of query entries ( ) and each sub-result list being established in such a way that the number of results is less than or equal to said maximum number of results.

According to the invention, a combination of entries may comprise only one entry.

When, as stated in claim 34, the establishment of sub-queries is established by means of a binary traversing of appropriate query entry combinations, a further advantageous embodiment of the invention has been obtained.

Moreover, the invention relates to a method of establishing a robot for accessing attributes and/or entities in a data source (DS) according to claim 35 said method comprising the steps of reading the contents of the data source establishing a series (SL) of processing steps (PS) from a set of possible processing steps (PS), said processing steps (PS) being adapted to performing a certain predefined type of data analysis.

When, as stated in claim 36, at least one of said processing steps (PS) uses a nodeprocessor, a further advantageous embodiment of the invention has been obtained.

When, as stated in claim 37, said establishment of a series of processing steps (PS) is performed automatically, a further advantageous embodiment of the invention has been obtained.

It should be noted that a semi-automatic establishment of the processing steps is preferable according to some embodiments. Such an application would typically include manual establishment of some of the steps and automatic establishment of other steps.

When, as stated in claim 38, at least one of said processing steps (PS) processes a subset of a data source, a further advantageous embodiment of the invention has been obtained.

When, as stated in claim 39, at least one of said processing steps (PS) processes a node of a DOM tree representing a subset of a data source, a further advantageous embodiment of the invention has been obtained.

When, as stated in claim 40, said processing step (PS) is adapted to outputting a node representing a subset of the data source to another processing step, a further advantageous embodiment of the invention has been obtained.

When, as stated in claim 41, said processing step (PS) is adapted to outputting a node representing a subset of the data source to the next processing step in the step line (SL), a further advantageous embodiment of the invention has been obtained.

When, as stated in claim 42, said nodeprocessors are adapted to different predetermined types of analysis and/or processing, a further advantageous embodiment of the invention has been obtained.

When, as stated in claim 43, said nodeprocessors available for a certain processing steps depend on the selected input, preferably an input node, a further advantageous embodiment of the invention has been obtained.

Moreover, the invention relates to a marketplace web-site according to claim 44 comprising an input query form or search tool, said form or search tool comprising a number of input query types, preferably including selections, intervals and numbers, said web site communicating with at least two data independent sources (DS), preferably web-sites and/or relational databases and said marketplace web-site comprising means for mapping a query established by means of said input query form or search tool into a number of sub-queries, preferably one for each data source, at least two of the sub-queries being adapted to accessing information from at least two corresponding independent data sources.

Each sub-query may be performed by a robot dedicated to the specific data source.

Moreover, the invention relates to a marketplace web-site according to claim 45 comprising an input query form or search tool, said form or search tool comprising a number of input query types, preferably including selections, intervals and numbers, said web-site communicating with at least two data independent sources (DS), preferably web-sites and/or relational databases, said market place web-site comprising means for storing data extracted from said data sources in a central database (DB) and said marketplace web-site comprising means for mapping a query established by means of said input query form or search tool into the database (DB).

When, as stated in claim 46, at least one of the stored entities (E) in the data base (DB) comprises a link (DA) to at least one dedicated document (DOC) located at the data source (DS), and when said dedicated document (DOC) is only accessed by the retrieving profile (RP) if a change of the corresponding entity (E) in the database (DB) has been detected, a further advantageous embodiment has been obtained.

Moreover, the invention relates to a data carrier comprising computer readable instructions for establishment of a robot or a robot system according to claims 26-32 in a computer system.

Moreover, the invention relates to a data carrier comprising computer readable instructions for performing the method according to claims 1-25 and 32-46 in a computer system.

A data carrier would e.g. be a CD, web server or another suitable storing means.

FIGURES

This invention will be described below with reference to the drawings of which

FIG. 1 shows the basic principle of accessing data sources according to the invention, FIG. 2 illustrates the nature of a data source to be accessed according to the invention, FIG. 3 illustrates the identification and categorization of attributes of a data source according to the invention, FIGS. 4a-4d illustrate the access of an individual data source according to an embodiment of the invention, FIG. 5 illustrates the variation of data sources on the Internet, FIGS. 6a-6d illustrate access of a data source via a form according to one embodiment of the invention, FIG. 7 shows the basic principles of the search strategy of the invention as a series of steps to be performed (not necessarily in the same order as shown in the figure), FIGS. 8a-8c show an example of a simple table from an imaginary web site and two different representations of the HTML document creating the table FIG. 9 shows an example of a graphic user interface implementing the robot building tool, and where FIG. 10 illustrates an optimized method of accessing data sources according to the invention.

DETAILED DESCRIPTION

FIG. 1 shows the basic principle of accessing data sources according to one embodiment of the invention. Evidently, numerous other methods are applicable within the scope of the invention.

The illustrated system is run by standard computers e.g. mutually connected via the Internet.

The illustrated system comprises a plurality of data sources DS. The data sources DS are generally independent, at least with respect to the form according to which data is stored in the individual data sources. Typically, there will no common access key to the data elements of the data source.

According to the invention, a large number of independent web-sites may be accessed by means of the same retrieving profile.

An typical independent data source according to the invention may be understood as a data source being established independently of the retrieving profile RP. In other words, when established the retrieving profile no help for automatically interpretation should be expected from the data source at all.

An important characteristic of an independent data source is that an entity is retrieved from the data source without the transferring of unique ID coding. The identification of the individual transferred entities is based solely or primarily on the basis of the combinations of the attributes comprised in the retrieved entity and/or the environment from which the entity is retrieved due to the fact that no unambiguous key related to the entity should be expected from the data source.

Hence, according to one teaching of the invention, the relaxed requirements with respect to syntax and representation of the entities of a data source facilitate access and roboting of data sources which, until now, have been accessible only via manual search.

An example of representative data sources of the above-mentioned kind may e.g. be a web site offering second-hand cars. Each web-site is typically owned by independent car dealers offering different car models from different years, different prices, etc.

An important feature of the exemplified type of data source is that a car of a certain type, model and year may be offered for sale at different prices by the car dealer due to e.g. different price policies and different conditions of sale. This aspect illustrates that the mere identification of a car model at a web-site only reveals very little information about the specific car offered for sale. In the light of that explanation, each second-hand car offered may be regarded as unique.

Other examples of such data sources may e.g. be job-advertising, loan offers, odds, offers, news, etc.

Evidently, data sources according to the invention may comprise combinations of new and second-hand objects or even other types of objects.

The nature of a data source according to the invention will be described in detail with reference to FIG. 2.

Returning now to FIG. 1, each data source DS may be visited by a user U via a retrieving profile RP. The illustrated embodiment of the invention includes a database DB which may be accessed for reading and writing purposes via the retrieving profile.

Each data source may be visited via the retrieving profile RP if a user U addresses a query at the involved data sources DS. The retrieving profile RP may be implemented in several different ways within the scope of the invention.

According to the illustrated embodiment, the retrieving profile RP comprises robots each accessing the different data sources DS and retrieves information about a certain domain of entities. An example of such a domain may e.g. be the above-mentioned domain of cars offered for sale. The retrieved information may be interpreted by the robot and the information stored wholly or partly in the database DB in an easy searchable format. Evidently, the database may link the user to the original data sources if so desired. The update rate of the robot may be established according to several different trigger criteria. One of the criteria may be a robot dedicated to a certain data source and adapted to visiting the data source at certain time intervals.

According to the illustrated embodiment of the invention, a query may be carried out by means of a search in the database DB instead of visiting the data sources.

Hence, the function of the retrieving profile is to guide one query or a set of queries in such a way that each entity matching the user query may be presented to the user.

Another possible implementation of the retrieving profile (not illustrated) may be an encapsulation of each or some the data sources in such a way the query is suitably directed at the contents of a data source. The most important function of such an encapsulation contained in the retrieving profile is to avoid unnecessary searching in parts of the data source which have already been identified as irrelevant to the specific user query.

Returning now to the illustrated embodiment, an example of a query established by the user U may be a query for a car of the type "Porsche" less than three years old and offered at a price interval of $10,000 to $11,000. The query may typically be invoked by filling in a form offered to the user U at a web based market place controlling or facilitating the illustrated system. The retrieving profile RP may subsequently perform a search in the database DB without consulting the data sources and the result may be listed to the user at the provider web-site. A user may subsequently choose to access the original data sources, e.g. the web-site, in order to obtain additional information, such as a picture or further description of the located cars via a link associated with the car in the result list.

The retrieving profile RP may be regarded as a program structure established in order to match a user query to all data sources inferred by a user request.

FIG. 2 illustrates the complex nature of a data source to be accessed according to the invention. The illustrated data source DS has a data structure which is initially unrevealed and incompatible with the access tools of the retrieving profile RP associated with the specific data source DS.

Initially, the data source DS regards the automatic retrieving profile as a chaotic plurality of information. According to the illustrated embodiment, the character-based information of the data source DS has been converted into a number of attributes of identified text strings. Evidently, attributes may be encoded and decoded in various formats such as character based formats, image based formats and active content formats, such as Java applet, JavaScript application or VB script application.

The text strings may e.g. be a mix of text strings identifying car names, model names, numbers, etc.

Subsequently, the data source must be evaluated and interpreted in order to facilitate access to hidden information by the retrieving profile RP.

FIG. 3 illustrates identification and categorization of attributes of a data source according to the invention.

The attributes, i.e. the text strings of the data source, may subsequently be interpreted and combined into so-called entities of associated attributes ASA. The associated attributes may be established so as to comprise certain predefined types of attributes, i.e. categorized attributes.

An example of an entity is a car entity comprising the categorized attributes CA "Trabant", '88 and $100,000 where the first attribute of the category is car model, the second attribute of the category is manufacturing year and the third attribute of the category is the price.

Each entity is established as a set of associated attributes ASA and the irrelevant attributes are filtered away.

Evidently, the establishment of entities of associated attributes may be performed in several different ways, and more or less automatically, within the scope of the invention. It should be noted that the preferred embodiment of the invention implies a completely automatic establishment of as many robots as possible.

A detailed description of a semi-automatic robot establishment according to one embodiment of the invention is described with reference to FIGS. 7 to 9.

Subsequently, the identified entities may be copied into the central database DB means in such a way that the retrieving profile initially performs a query in the database instead of visiting every involved data source DS and lists the results to the user according to a predefined listing format. This feature ensures quick access to the search result. If the user U requires additional information, this information may be obtained by means of a link contained in the above-mentioned result list.

When the entities have been copied to the database and associated with the retrieving profile, further information is added to the retrieving profile in the form of a robot adapted to the data structure of the specific data source. This robot is associated with the retrieving profile in order to visit the data source according to certain trigger criteria and to reevaluate the data source in order determine whether the contents of the data source have been changed. Hence, the robot will access the data source e.g. at certain intervals and update the contents of the database if changes have occurred. Such an automatically handled change may take place if e.g. one entity has been removed from the data source and replaced by two other entities where the removed entity represents a sold car and the two new entities represent cars introduced for sale.

Such a change observed by the robot should of course be reflected in the database, as the sold car has to be removed and the two cars be added to the database in order to reflect the state of the data source when the data source is visited.

A change may likewise be stored and registered for statistic purposes in another database.

If, on the other hand, the data structure of the data source has changed in such a way that the robot is no longer able to extract the correct information, an error is reported to the retrieving profile. Such an error results in the establishment of a new robot fitting the new structure of the data source.

It should be noted that each data-source typically requires a dedicated robot.

FIGS. 4a to 4d illustrate some important features of the invention with respect to the above-mentioned retrieving profile RP. It should be noted that the two different ways of operating the retrieving profile are only examples and do in no way restrict the operation of retrieving profiles to only the illustrated two. The use of the retrieving profiles implies several possible modifications within the teaching of the invention.

The circles involve a system operation or system source, the squares involve an independent data source and the hexagonals involve a user operation such as a query.

FIGS. 4a and 4b illustrate the operation of a retrieving profile if a method according to the invention involves the utilization of a central database.

According to the first embodiment, the retrieval/analysis of data from a data source DS and the retrieval of data from the data source performed by a user via a user query are basically two different processes (operations).

FIG. 4a illustrates a first embodiment according to which the system analyzes and retrieves information from a single data source basically independently of any user query.

The operation may be as follows: A data source DS is visited as a result of the fulfillment of certain trigger criteria TC. Visiting the data source DS is established via the retrieving profile RP. No structural information about the data source will be found if the data source has not been visited before. Such a situation triggers an initial analysis of the data source. The extracted entities are stored in the central database DB according to predefined storing criteria and a robot is established for later access to the data source according to the identified data structure of the source. The robot will be contained in the retrieving profile.

In another scenario, the data source will be accessed directly by the already established dedicated robot if the retrieving profile related to the specific data source contains information determining the data structure of the data source.

The retrieving profile is subsequently modified if minor changes in the data structure of the data source are detected insofar the existing robot may be suitably modified. If not, an error flag is raised and a new robot has to be included in the retrieving profile.

Evidently, several different trigger criteria may be established within the scope of the invention.

FIG. 4b illustrates the function of the system from another point of view. The figure illustrates the invoked procedures if a user query Uq is established according to the illustrated embodiment of the invention. A user query Uq is entered via e.g. a user query form, e.g. a web site. The user query Uq contains different entries specifying the desired information within a certain domain. This query invokes a search in the central database DB containing a "mirror" of all entities identified in the searched data sources as described above.

The search may be performed in a quick manner due to the fact that the entities are contained in a database having a high degree of order.

The result of the search is returned to the user in a predefined way and the user may typically be guided to the original data sources DS by means of a link incorporated in the result list if the user so desires. This option is illustrated by the dotted lines.

It should be noted that the procedure of traversing through the involved data sources and the establishment of a central database according to the illustrated embodiment are separate functions and principally non-correlated with the search performed in the database upon request by a user query.

The basic understanding of the application is that the maintenance of the system is separated from the utilization of the system.

Turning now to FIGS. 4c and 4d a further embodiment of the invention has been disclosed. This embodiment implies a higher degree of correlation between the maintenance and the facilitated queries.

FIG. 4c illustrates the initial establishment of a retrieving profile RP fitting a specific data source DS. The establishment is triggered by certain trigger conditions.

The retrieving profile RP will be updated when the data source DS has been analyzed and the data structure of the data source has been identified. The retrieving profile RP is established as an encapsulation of the corresponding data source DS. However, in this case no data will be stored in a database. Instead, the retrieving profile RP may be regarded as a robot dedicated to a specific data source, and the robot may be triggered by a user query.

FIG. 4d illustrates a user request Uq triggering access to some data sources DS containing the entities matching the user query.

When the desired entities have been retrieved, the result is returned to the user and the retrieving profile is updated if relevant changes in the data structure have occurred.

The retrieving profile RP of the illustrated embodiment contains information matching the user query Uq to the already analyzed contents of the data sources. Such a retrieving profile requires a high degree of refinement in order to obtain a real-time search in the data sources. It should be noted that access to the individual data sources may be quite time-consuming. Hence, in order to reduce the query response time, the retrieving profile should contain quite a lot information about the entities and the grouping of entities in the individual data sources.

It is to be noted that local query tools may be used for both real-time and full extraction.

Finally, it should be emphasized that the above-mentioned access philosophies may be combined if so desired.

In order to explain the quite complex situation of visiting independent data sources, a further detailed explanation will be provided below.

FIG. 5 illustrates the variation of data sources on the Internet. Specifically, the example illustrates that several different access methods have to be established when dealing with different types of data sources in the form of web-sites.

FIG. 5 illustrates three different independent data sources DS1, DS2 and DS3.

Each data source forms an Internet web-site open to public access.

The first data source comprises a number of documents D accessible via a local query form LQF1. The form comprises a number of input fields, IQE, by which a user may input certain types of entries in order to conduct a search. Traditionally, such entries may be established via dedicated input fields. Evidently, several other input forms may be applicable.

The result of a query is monitored by a number of result lists RL and each list comprises a maximum number of hits. At some sites, such list are truncated if the number of hits exceed a certain number and data is lost.

Another data source DS2 comprises a web site of two documents. The site offers no form facilities and the information is presented by means of simple listing or even as pure text documents.

A third data source DS3 also comprises a number of documents D which may be queried by means of a local query form LQF3. The form comprises a number of input fields by which a user may input certain types of entries in order to conduct a search.

As for the data source, DS1, the result of a query is monitored by a number of result lists RL and each list comprises a maximum number of hits. These lists must be scrolled sequentially in order to access the query hits. The illustrated result lists may each comprise a maximum number of hits which is greater than the result lists of DS1.

It may easily be understood that automatic access to the entities is very difficult for the different data sources for different reasons.

Hence, if the data source DS1 is queried by the retrieving profile and the resulting hits of the query exceed the maximum number of hits presentable in the result list, a complicated situation has arisen.

Moreover, data source DS2 comprises more or less chaotic information, and an intelligent method must be applied in order to establish and interpret the relevant information of the site.

The third data source DS3 looks a little like DS1 but differs significantly since the result list allows a greater number of hits in the result lists RL compared with that of the result list of DS1.

Moreover, the possible query entries of LQF3 differ from the possible query entries of LQF1.

According to the invention, the data sources are accessed via a user query form UQF comprising a fill-in form suitable for all possible types and combinations of queries.

The illustrated user query form covers possible queries of local query forms and a further possible query fields addressing added information obtained by the predescribed classification.

A query type may e.g. be a car model, price, year, etc.

Typically, a certain minimum of information must be present at the web-site, such as price and car model. Such minimum criteria may be contained in the retrieving profile.

A possible breakdown of a data source according to an embodiment of the invention will be described with reference to a binary query tree QT.

The illustrated method may be used for both total extraction from a data source or a direct user request.

The query tree QT illustrates how a local query form may be controlled to present a number of partial result lists representative of the total number of hits, and thus overcoming the problem of truncated result lists.

The illustrated example comprises a very simple data source, e.g. a web site offering second-hand cars.

The data source may be accessed through a query form having two possible query types; car model and year. The possible car models are Audi, BMW and Ford. The possible years are from 1980 to 2000.

According to a first entry, the data source is queried for an Audi: car model, C1, and within the possible years of 1980 to 2000.

The result of the initial query is 42 hits, but the present site truncates the result list to 20 hits, i.e. 20 cars.

Accordingly, the initial query is automatically divided into two child nodes, C1&1980-1989 and C1&1990-2000. These queries should result in 29 and 3 hits respectively, i.e. too many hits in the first node.

Accordingly, the first node binary is divided into two queries C1&1980-1984 and C1&1985-1989. The number of results corresponding to each query is now 17 and 12, respectively.

Consequently, the initial query of C1&1980-2000 has now been fractioned into three queries C1&1980-1984, C1&1985-1989 and C1&1990-2000 providing the desired result in a result list having less than 20 true hits which are not truncated.

It should be noted that a complete query tree according to an embodiment of the invention may typically be stored in the retrieving profile once a data source has been accessed. Later, when the data source is accessed again, the data of the data source may be retrieved by means of the stored query combination. If, on the other hand, the contents of the data source have changed by removal or addition of entities, the stored query combination is no longer valid, and the query combination has to be recombined. This recombination is facilitated by storing the entire tree due to the fact that the query combination may be changed very quickly by means of a simple reconstruction of the query tree.

If, for instance, the above-mentioned node C1&1980-1984 now contains a number of hits exceeding 20, the node may be divided into two child nodes, C1&1980-1982; C1&1983-1984, and the remaining queries of the query combination may be maintained.

If, on the other hand, the two query nodes C1&1980-1984 and C1&1985-1989 result in a number of hits 6 and 12 respectively, the two nodes should be aggregated into one node, i.e. the parent node, now having 18 hits instead of the original 29 hits. Accordingly, time required for the entity extraction of the site may be reduced.

An example of a way of establishing a robot suitable for information retrieval from the data source DS2 according to the invention will be described later with reference to FIGS. 7, 8 and 9.

An example of a way of establishing a robot suitable for information retrieval from the data sources DS1 and DS3 according to the invention will now be described with reference to FIG. 6.

FIGS. 6a-6c illustrate access to a data source via a form according to one embodiment of the invention.

The example illustrated below shows a function which may be added to the robot of a data source accessible via a form.

According to the illustrated example, a data source of the nature mentioned above has been accessed. According to the illustrated embodiment, the retrieving profile RP has accessed a data source by means of an input query entry IQE1 via a local query form LQF. The request has resulted in a number of result list entities RLE exceeding the maximum number of the result list MRL.

To reduce the number of hits, a further input query entry IQE1 has been entered in FIG. 6b in order to narrow the query and to reduce the number of result list entities RLE. Still, the request has resulted in a number of result list entities RLE exceeding the maximum number of the result list MRL.

In FIG. 6c, the query has been further narrowed and the interval IQE3 has been further reduced. Consequently, the number of result list entities RLE is now less than the maximum number of the result list MRL.

The entities of the result list may now be analyzed and eventually copied to a database and entries corresponding to the obtained result stored in the retrieving profile RP.

Now, the difference between the result list entities RLE obtained in FIG. 6a and the result list entities RLE obtained in FIG. 6c is the complementary entries CRL.

This result list is obtained by entering a complementary input query CIQE3 as illustrated in FIG. 6d. According to the illustrated embodiment, the number of complementary result list entities CRLE is less than the maximum number result list. If not, the system should perform further iterations in order to divide the result list into a number of well-defined result lists.

The manner in which the subdivision of the result lists by performing query iterations as combinations of queries and query intervals in the input form takes place is stored in the retrieving profile RP for later use. Subsequent access to the data source will then be performed in steps according to the stored iteration. If a previous iteration stored in the retrieving profile is no longer effective due to changes in the number and types of entities in the data source, another iteration will be added to the retrieving profile RP in order to extract the desired entities.

Below, FIGS. 7 to 9 illustrate the semi-automatic establishment of a robot to a specific web-site. The established robot will be contained in the retrieving profile.

An aspect of the invention is to search a number of web sites for a specific type of items, e.g. used cars for sale, at regular time intervals and to save the located information in a well-defined format in a central database. When a customer requests data on items corresponding to a certain set of search criteria, the data will be located in the database.

Each record (item) in the database has the same field, attributes, even though the data in the records may be collected from a number of different web sites. This increases the search opportunities, because the customer will be able to search a number of web sites simultaneously with the same search criteria (a single attribute or a set of attributes) that may not even be available on any of the web sites being searched.

Searching the web sites and saving data at regular time intervals provides an advantage compared with the normal strategy of real-time searching on customer request if one or more of the searched web sites are inaccessible at the time of the request. In the case of real-time searching, no data from the actual web site(s) will be available to the customer, whereas the latest collected data from the given web site(s) will still be available (although they are not brand new) when using a database. If a suitable time interval between searches has been chosen, the contents of the web sites being searched will not change dramatically from one search to the next.

FIG. 7 shows nine steps illustrating the basic principles of one embodiment of the invention to be explained in the following:

Step 1: Definition of a Model

A model is a set of attributes (database fields) representing the type of items the robot is searching for. If, for instance, the robot is searching a web site for used cars for sale, each entity will consist of all model attributes of a given used car (year, mileage, price, number of doors, color, engine size etc.).

If more web sites are searched for a certain type of items (by different robots), the same model will be used by all robots, because the data collected will be saved in the same format in the same database. Since far from all attributes will be found on all web sites (sometimes the same attributes will not even be found for all entities on the same web site), the database must have some kind of a code for "data unknown" for (at least) some of the fields.

Step 2: Address Data on the WWW

Since the robot is built for searching a specific web site, one of the first things it must know is the URL (Uniform Resource Locator) of the HTML page on which the search is to be initiated. (A URL is a unique address on the Internet.)

Step 3: Removal of Unnecessary Information

The HTML (and XML) documents hold a lot of information (font sizes, font types, colors etc.) irrelevant for the robot which is only concerned about the data contents of the web site. If such information is removed from the document, further processing and searches can be performed on a smaller and simpler document.

Of course, the HTML or XML source documents of a given web site can only be altered by the owner of the site. The robot building tool works on copies of the original source documents.

Step 4: Correction of Errors in the Document

A lot of the HTML documents accessible on the WWW have syntax errors. Often, these errors have not been discovered by the builders of the web sites, because modern Internet browsers (programs that convert the HTML documents into the desired images on the monitor) are very tolerant towards this kind of error.

The problem is that the tools used for converting the documents into structured object models (see explanation of step 5 below) are very sensitive towards errors.

Some of the errors will disappear when the unnecessary information is removed as described above, and some of them can be corrected by the robot building tool as it is often quite obvious from the very logical and hierarchical structure of HTML documents how it was supposed to be, had there been no errors.

Step 5: Representation of the Document as a Structured Model

The hierarchical structure of the HTML documents makes it possible to represent a document as a tree structure. An important part of the roboting system used by the invention is such a tree structure model of the HTML documents which makes it easier to access the contents of the documents, to manipulate the documents and to navigate around inside them.

This model is called Document Object Model (DOM).

DOM has been developed by the World Wide Web Consortium (W3C), which is an organization consisting of a large number of developers, researchers and users, whose main purpose it is to develop common protocols and to manage the development of the Internet. Tools building the DOM tree structure corresponding to an HTML document are commercially available.

Step 6: Pointing Out the Entities

The person building the search robot has to find out where the data describing the individual entities (e.g. used cars) is located on the web site.

In a simple scenario, all data regarding a single will be found in a single row in a table, but in more complicated cases, the user of the robot building tool will have to collect the information from different locations on the site. Sometimes it can be necessary to search different pages (with different URLs) on the web site in order to find all attributes associated with an entity.

Step 7: Pointing Out and Extracting Associated Attributes

A major part of the work consists of navigating the robot around the web site (usually through a number of web pages, tables and table rows) in order to point out and extract each of the attributes associated with an entity and made available on the actual web site. The robot will collect one set of attributes or one entity at a time. The attributes associated with an entity being collected will be located in a particular order defined by the programmer of the robot.

The pointing out typically consists of locating a specific cell in a table having the desired attribute associated with the entity being collected.

In a simple scenario, the extraction of the attribute is done by reading the contents (a number, a name or a code) of the table cell pointed out, but it may also be a much more complex task like recognizing and picking out parts of a text string or even adding attributes, that are not on the web site. If, for instance, a certain car model is known always to have the same engine size, the "engine size" attribute can be filled out, even though only the model number or name can be found on the web site.

Sometimes the programmer will have to fill in some of the attributes manually. If, for instance, a table is known to have data for a number of used cars from 1997 and each row of the table holds information describing a certain car, the robot will not be able to locate the attribute "production year" in the row corresponding to the entity (car) being collected, and the programmer will have to enter the data value "1997" into the proper attribute for each of the entities being found and collected.

Step 8: Verification of Extracted Attributes

When the attributes are extracted, a type check is performed in order to ensure that the found data is valid. If no valid data is found at the expected location on the web site or if something else goes wrong during the navigation around the site (typically because the layout of the site has been changed since the robot was programmed), the robot will send an error message to its owner who will have to correct the error (often by adapting the robot program to the changes that have been made on the web site being searched).

Other kinds of error checks can be performed. If, for instance, a robot usually locates a large number of entities on a web site and then suddenly locates none, it would be a good idea for the owner of the robot to find out what has happened!

Step 9: Saving the Entity in the Central Database

When all available attributes associated with a certain entity have been found and checked, the entity is saved in the central database along with other entities found on the same and other web sites.

FIG. 8a shows an example of a simple table from an imaginary web site holding a small amount of data for two used cars for sale. Information on the WWW will typically be presented in tables, each of which may have a visible or an invisible table structure.

FIG. 8b shows the HTML document creating the table shown in FIG. 8a.

The basic elements of HTML are the "tags" which are simple codes enclosed by the symbols "<" and ">" (e.g. <TABLE>). Almost all tags appear in pairs consisting of a start tag and an end tag. The end tag is the same as the start tag with the addition of a slash ("/") before the code itself.

Figures 8A, 8B, 8C:
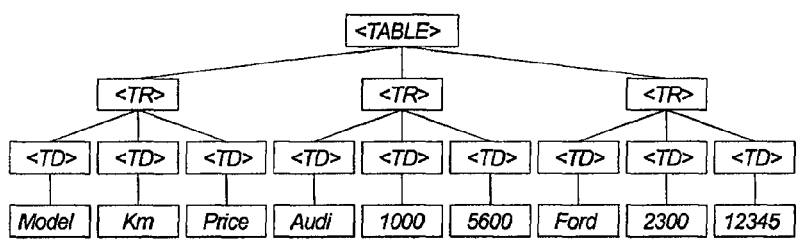

HTML uses approx. 50 different tags or pairs of tags of which only three pairs are used in the code in FIG. 8b:

The tags <TABLE> and </TABLE> define the table itself.

Each of the three tag pairs <TR> and </TR> defines a Table Row within the table.

Within each table row, each of the three tag pairs <TD> and </TD> defines Table Data corresponding to a cell in the table.

The text inside each pair of Table Data tags defines the contents of the corresponding table cell.

The syntax errors mentioned above in the explanation of step 4 in FIG. 6 will typically consist of different tag pairs merged together or missing end tags.

A DOM tree structure corresponding to the HTML document is shown in FIG. 8c.

Figure 9:
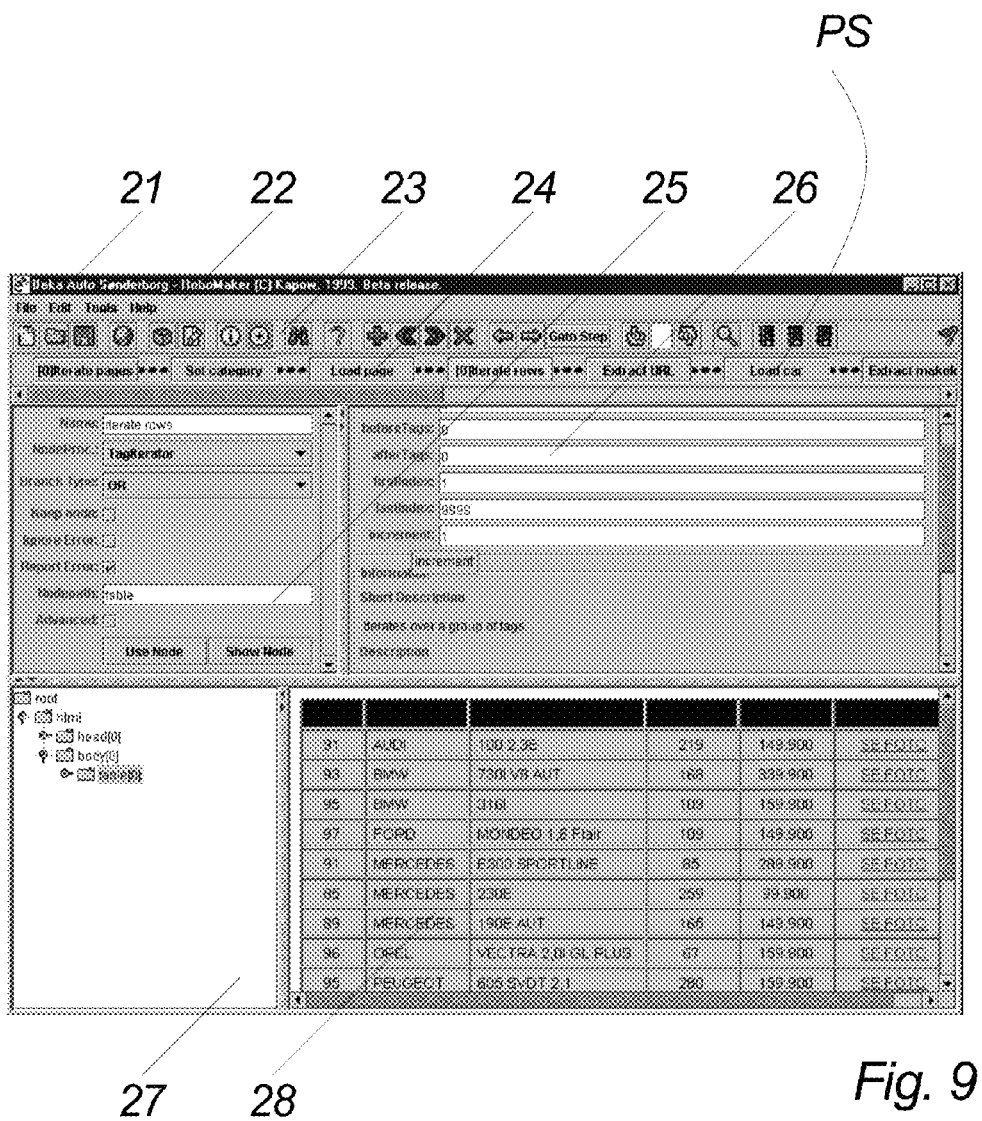

FIG. 9 shows an example of the graphical user interface according to an implementation of the invention consisting of a title bar 21, a menu 22, a tool line 23, a step line 24, a configuration window 25, a NodeProcessor configuration window 26, an HTML tree window 27 and an HTML parser window 28.

The title bar 21 shows the name of the robot being created ("Beka Auto Sonderborg" in the example in FIG. 9 and the name and version of the robot building tool.

The menu 22 has four options: File, Edit, Tools and Help, each of which has a number of subcommands in a roll-down curtain menu.

The tool line 23 shows a number of tool buttons providing direct access to a number of functions, some of which can also be reached through the menu options.

Among the functions on the tool line are tools that enable the programmer to:
  open and save robot files
  configure a robot (provide it a name, start URL and other elements common to all entities)
  manipulate and navigate around the path of steps that the robot has to go through
  move through iterations step by step
  change the contents of the HTML parser window (see below)
  comment on the robot code
  search for a specific node in the HTML tree
  debug the robot.

The step line (24) shows a graphical model of the path that the robot has to follow in order to extract the desired information from the HTML document. The path is built by the user and consists of a number of steps, each processing a node or a sub-tree in the HTML tree using an individually configured NodeProcessor chosen from a list of different NodeProcessor types.

It is possible to jump between the steps in the path by clicking on the corresponding boxes in the step line. The actual step being configured is highlighted in green. (In the example in FIG. 9 the actual step is "Iterate rows".)

The robot step line can have AND and OR branches, meaning that at a certain level in the HTML tree, the robot has to perform a number of steps or only one step.

The configuration window 25 is used for setting up the common step features of which the more important are:

Name:

The name of the actual step ("Iterate rows" in the shown example) which is chosen freely and typed into the edit box by the user.

NodeProc:

The type of NodeProcessor to be used for the actual step (chosen from a list of NodeProcessor types). In FIG. 9, a NodeProcessor of the type "TagIterator" has been chosen.

The number of available NodeProcessor types depends on the type of node in the HTML tree being processed.

Branch Type:

The type of branch if the step path is branched. The branch type can be either OR (like in FIG. 9) or AND.

Keep Node:

A check box to be checked if the robot should perform the next step on the top level of the HTML tree. If the box is not checked (as in the shown example), the next step will be performed at the same level in the HTML tree.

Node Path:

The path of the node in the HTML tree to be processed ("table" in FIG. 9). There are two ways to select the node. The first way is to click on it on the HTML tree in the HTML tree window below and click on the "Use Node" button afterwards (which will put the path of the node into the edit box). The other way is to type the path of the node into the edit box and click on the "Show Node" button afterwards (which will highlight the node in the HTML tree).

The NodeProcessor configuration window (26) is used for setting up the specific step attributes, depending of the type of NodeProcessor chosen in the configuration window.

Each NodeProcessor works on a single node or on a node and its sub-hierarchy (sub-tree).

The different types of NodeProcessors can be grouped according to their function:

PageLoader

This NodeProcessor loads an HTML page into the robot.

Tree Manipulators

NodeProcessors of this type change the node or sub-tree being processed, create and remove nodes, save sub-trees and restore saved sub-trees, define new top nodes, divide tables into sub-tables, transpose tables, divide text nodes into sub-nodes etc.

Iterators

The iterators are used for searching the page for all entities of the desired kind, processing each row in a table or each table on a page one at a time etc. The iterators can be combined with filters changing the iterations (e.g. skipping certain table rows under certain circumstances).

Extractors

The NodeProcessors in this group extract data when the robot has located the HTML node(s) containing it.

Some of them extract a single attribute from a single node or a sub-tree. Others extract a group of attributes from a group of nodes (e.g. a node and its sub-tree or a table row). This can be done in a more or less intelligent way.

The attributes can be represented in a number of different ways (an attribute can e.g. constitute the total contents of a node or it can form a part of a text string).

Extractors can also be used for other things than attributes. For instance, if some of the attributes have to be found on another HTML page, an extractor can be used for extracting the URL for this page from a node.

ModelDone

This is a special NodeProcessor telling the robot that all attributes associated with the entity currently being collected have been located, so that the entity can be saved and the robot can begin to collect the next entity.

The HTML tree window 27 shows the tree model (the DOM hierarchy) of the HTML document with the node being highlighted and processed by the actual step. It is possible to navigate between the different HTML tags by clicking on the corresponding nodes in the tree.

The HTML parser window 28 shows either the HTML document itself as text or the interpreted graphical HTML document corresponding to the selected node (and its sub-tree) in the HTML tree to the left. One of the buttons in the tool line 23 is used for switching between the two types of contents in the window.

It should be noted that several other NodeProcessors and types of Nodeprocessors are applicable within the scope of the invention.

Figure 10:
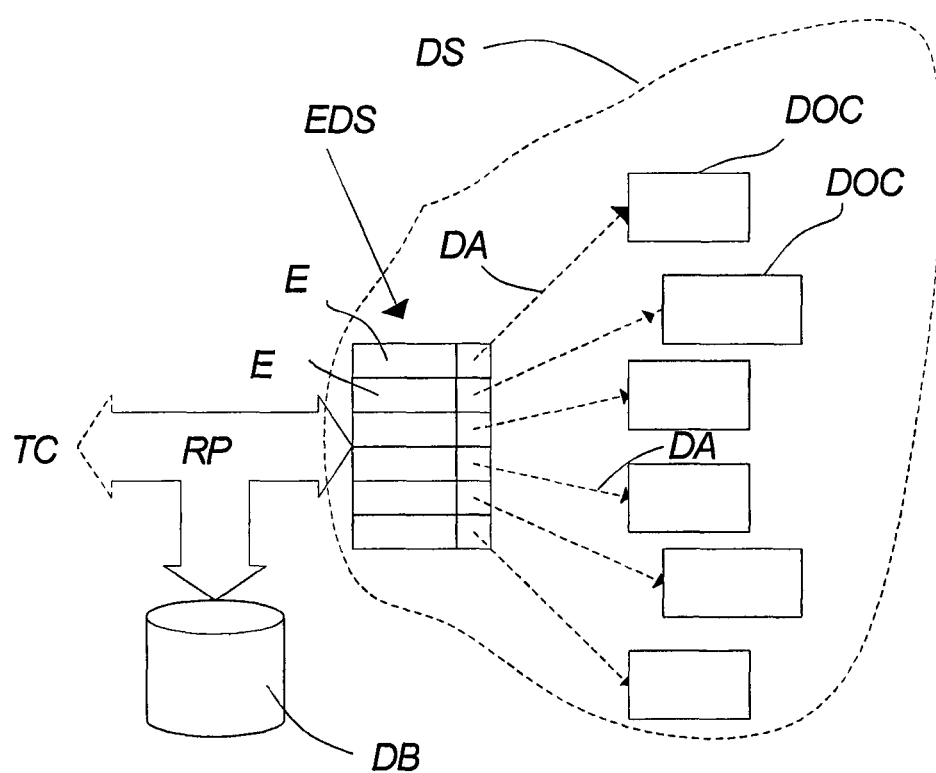

FIG. 10 illustrates a further advantageous feature of the invention, according to which data extraction from a web site is optimized significantly.

The illustrated system comprises a data source DS and a corresponding robot. The robot dedicated to the illustrated data site is contained in a retrieving profile dealing with multiple data sources (not shown). The illustrated system solely focuses on the functioning of the illustrated robot, but it should be noted that the illustrated robot may be combined with several other robots dealing with other data sources.

The illustrated retrieving profile facilitates access to the illustrated data source and stores the extracted data, i.e. entities, together with extracted data from other data sources (not shown) in one common searchable data base DB.

The entities or some of the attributes of each entity E are copied and stored in a searchable database DB, and the illustrated copied entities comprises anchors DA, (i.e. links) to dedicated documents DOC of the original data source. DS. The dedicated document(s) DOC may comprise further information about the entity in the form of e.g. picture information, etc. Moreover, the detected data structure is stored in the retrieving profile EP as a so-called expected data structure EDS. According to some of the embodiments of the invention, this structure will be stored directly in the data base DB. The expected data structure EDS represents a template according to which the retrieving profile RP will access the data source when the data source is accessed the next time.

A problem with the documents related to an entity is that a repetitive thorough analysis of such dedicated documents is undesirable, and a method feature according to the invention dealing with that problem will be described in the following.

According to the illustrated embodiment of the invention, a retrieving profile has already been established during a previous analysis and data extraction of the data source.

According to the illustrated embodiment of the invention, the retrieving profile contains information pointing out that each entity (or some) of the data source DS comprises an anchor to a dedicated document D.

When access to the illustrated data source DS has been trigged by certain trigger criteria TC, and the contents of the data structure, e.g. a table, have been extracted, each entity of the table is compared to the contents of the database DB in order to find out whether the entity has b-een changed. If no change has occurred, no analysis of the dedicated document will be performed due to the fact that a change in the dedicated document is expected to be reflected in the table. On the other hand, if the entity has changed, the dedicated document DOC will be visited and analyzed for extraction of further data via the anchor DA comprised in the entity E.

It should be noted that a change of an entity may be quite difficult to detect according to the invention due to the fact that the entity is usually identified solely on the basis of the combination of the attributes. Consequently, a change in entity would typically be regarded as a new entity unless certain precautions are made.

According to the illustrated embodiment of the invention, the retrieving profile benefits from the fact that the dedicated documents will typically be referred to by means of an unique URL.

Hence, if an entity comprises a number of attributes which has been changed with respect to a previously found entity having the same URL stored in the database DB, the dedicated document should be accessed.

Evidently, according to the above-described embodiment, the necessary search and analysis of a data dedicated documents DOC of a data source may be minimized.

The invention claimed is:

1. A computer-implemented method of retrieving attributes from at least two data sources by:
   accessing the data source(s);
   identifying a number of attributes of said data source(s);
   associating at least two attributes to a set of associated attributes;
   storing a retrieving profile according to which attributes of the data sources may be retrieved; and
   in response to determining one or more predefined conditions are met, storing a new retrieving profile according to which attributes of the data source(s) may be retrieved, wherein the one or more predefined conditions comprise at least one of:
      the data source having changed in such a way that a new retrieving profile is necessary for retrieving data from the data source;
      an instruction to establish a new retrieving profile every time data is retrieved from the data source; and
      a requirement to enhance the retrieving profile in response to detecting minor changes in a data structure of the data source.

2. The method of retrieving attributes according to claim 1, whereby the retrieving profile comprises at least one search profile according to which the attributes may be accessed.

3. The method of retrieving attributes according to claim 1, further comprising categorizing at least two of the sets of associated attributes into categorized attributes.

4. The method of retrieving attributes according to claim 1, further comprising displaying the set of associated attributes via a central window.

5. The method of retrieving attributes according to claim 1, further comprising:
   forming at least one entity, each entity being formed from at least one of the sets of associated attributes; and
   assigning an entity identifier to at least one associated set of attributes.

6. The method of retrieving attributes according to claim 5, further comprising: determining a data storage allocation structure according to which one or more of the entities may be retrieved.

7. The method of retrieving attributes according to claim 5, further comprising verifying one or more of the attributes and the entities subsequent to associating the at least two attributes into the set of associated attributes.

8. The method of retrieving attributes according to claim 5, further comprising storing information in a database, the information comprising one or more of:
   the sets of associated attributes; and
   the entities wherein the storing is performed according to certain predetermined storing criteria.

9. The method of retrieving attributes according to claim 8, further comprising storing the information in association with data from which the attributes and/or entities have been retrieve, and
   whereby the database comprises searchable attributes and/or entities.

10. The method of retrieving attributes according to claim 8, whereby said database comprises manual input.

11. The method of retrieving attributes from at least two data sources according to claim 8, whereby at least some of the information in the database comprises a link to at least one dedicated document located at the data source, and
   whereby the said dedicated document is only accessed by the retrieving profile if a change in corresponding information in the database has been detected.

12. The method of retrieving attributes according to claim 5, further comprising:
   receiving a subscriber request;
   determining whether the subscriber request matches one or more of the entities formed from at least one of the sets of associated attributes; and
   forwarding a mail-back message to a subscriber in response to determining the entities match the subscriber request.

13. The method of retrieving attributes according to claim 12, whereby the subscriber request comprises at least one query defined as an interval.

14. The method of retrieving attributes according to claim 1, wherein at least two of the data sources:
   are independent;
   have different data formats; and
   correspond to different retrieving profiles.

15. The method of retrieving attributes according to claim 1, further comprising:
   displaying the associated set of attributes in a central window; and
   verifying a new set of associated attributes identified from the data source(s),
   wherein the associated set of attributes are displayed in the central window until the new set of associated attributes has been verified.

16. The method of retrieving attributes according to claim 1, further comprising initiating access to the data source(s) on the basis of one or more pre-established trigger rules.

17. The method of retrieving attributes according to claim 16, whereby said trigger rules determine a frequency with which at least one of the data sources is accessed at a time interval.

18. The method of retrieving attributes according to claim 16, whereby said trigger rules determine a frequency with which at least one of the data sources is accessed on the basis of one or more user queries.

19. The method of retrieving attributes according to claim 16, whereby said trigger rules determine a frequency with which at least one of the data source(s) is accessed on the basis of one or more statistics of the data source(s).

20. The method of retrieving attributes according to claim 16, whereby said trigger rules determine access to at least one of the data sources upon receiving a request by the data source or an owner of the data source.

21. The method of retrieving attributes according to claim 1, whereby a user accesses the data source(s) via the retrieving profile.

22. The method of retrieving attributes according to claim 21, whereby the user further accesses the data source(s) via a database.

23. The method of retrieving attributes according to claim 21,
whereby the retrieving profile comprises at least one search profile, and
whereby the user accesses said data source(s) directly via the search profile.

24. The method of retrieving attributes according to claim 21, whereby the user accesses the data source(s) via a user query form, said user query form comprising at least two input query entries.

25. A data carrier comprising computer readable instructions for performing the method according to claim 1 in a computer system.

26. The method as recited in claim 1, comprising, in response to determining one or more predefined conditions are met, storing a new retrieving profile according to which attributes of the data source(s) may be retrieved, wherein the one or more predefined conditions comprise at least one of:
the data source having changed in such a way that a new retrieving profile is necessary for retrieving data from the data source;
an instruction to establish a new retrieving profile every time data is retrieved from the data source; and
a requirement to enhance the retrieving profile in response to detecting minor changes in a data structure of the data source.

27. The method as recited in claim 1, comprising retrieving the number of attributes from the data source(s) without transferring unique ID coding.

28. The method as recited in claim 1, comprising correcting errors in a document representing the data source(s).

29. The method as recited in claim 1, comprising removing irrelevant information from a document representing the data source(s); and
accessing the number of attributes of the data source(s) via the document.

30. A computer-implemented method of retrieving attributes from at least two data sources by:
accessing a retrieving profile according to which attributes of the data sources may be retrieved;
accessing the data source(s) on the basis of the retrieving profile
identifying a number of attributes;
associating at least two attributes to a set of associated attributes; and
in response to determining one or more predefined conditions are met, storing a new retrieving profile according to which attributes of the data sources may be retrieved.

31. The method as recited in claim 30, wherein the one or more predefined conditions comprise the data source having changed in such a way that a new retrieving profile is necessary for retrieving data from the data source.

32. The method as recited in claim 31, comprising reporting an error to the retrieving profile in response to determining the data source has changed in such a way that the new retrieving profile is necessary for retrieving data from the data source.

33. The method as recited in claim 30, wherein the one or more predefined conditions comprise an instruction to establish a new retrieving profile every time data is retrieved from the data source.

34. The method as recited in claim 30, wherein the one or more predefined conditions comprise a requirement to enhance the retrieving profile in response to detecting minor changes in a data structure of the data source.

35. A computer-implemented method of establishing a knowledge base, said knowledge base defining a number of relationships between attributes, said method comprising:
accessing a number of data sources;
identifying a number of attributes;
establishing a number of relationships between said attributes;
storing said established number of relationships between the said attributes; and
storing a retrieving profile according to which attributes of the data source(s) may be retrieved, in response to determining one or more predefined conditions are met, wherein the one or more predefined conditions comprise at least one of:
the data source having changed in such a way that a new retrieving profile is necessary for retrieving data from the data source;
an instruction to establish a new retrieving profile every time data is retrieved from the data source; and
a requirement to enhance the retrieving profile in response to detecting minor changes in a data structure of the data source.

36. A data source robot comprising data processing means for performing a computer-implemented method comprising:
automatically accessing the contents of at least one data source according to a retrieving profile;
identifying a number of attributes of said data source(s); and
associating at least two attributes to a set of associated attributes,
storing a retrieving profile according to which attributes of the data source(s) may be retrieved, in response to determining one or more predefined conditions are met, wherein the one or more predefined conditions comprise at least one of:
the data source having changed in such a way that a new retrieving profile is necessary for retrieving data from the data source;
an instruction to establish a new retrieving profile every time data is retrieved from the data source; and
a requirement to enhance the retrieving profile in response to detecting minor changes in a data structure of the data source; and
wherein said retrieving profile is configured to access an expected data structure of one or more of the data source(s), and
wherein said expected data structure represents the data structure of the data source as defined during at least one previous automatic access made to the data source by the data source robot.

37. A system comprising a plurality of the data source robot according to claim 36, wherein the system complies with the following provisos:
at least one of said robots being adapted to accessing a corresponding data source having an unknown data structure;
said access being established according to a retrieving profile; and
said retrieving profile comprising at least one expected data structure of said data source.

38. A system comprising a plurality of the data source robot according to claim 36, further comprising means for facilitating access by means of a common query form or query syntax to at least one of:

at least two of said data sources; and a database comprising the expected data structure of one or more of the data sources.

39. A data carrier comprising computer readable instructions for establishment of a robot according to claim 36 in a computer system.

40. A computer-implemented method of retrieving entities from one or more data sources using a local query form, said method comprising the steps of:

entering an initial combination of query entries;

submitting a query comprising the initial combination of query entries;

receiving a plurality of results corresponding to the query determining whether a number of the results invoked by the initial combination of query entries is greater than a maximum number of results; and in response to determining the number of results invoked by the initial combination of query entries is greater than the maximum number of results:

manipulating the initial combination of query entries to define a subsequent combination of query entries, the subsequent combination of query entries being defined in such a way that the results of the said initial combination of query entries may be aggregated into sub-result lists, each sub-result list being represented as a single result among the plurality of results;

submitting a subsequent query comprising the subsequent combination of query entries; and receiving a plurality of subsequent results corresponding to the subsequent query, the subsequent results comprising one or more of the sub-result lists, wherein each sub-result list is established by a sub-combination of said initial combination of query entries; and wherein each sub-result list is established in such a way that the number of results is less than or equal to the said maximum number of results.

41. The method according to claim 40, comprising establishing one or more sub-queries, whereby the establishment of sub-queries further comprises binary traversing of appropriate query entry combinations selected from among the initial combination of query entries and the subsequent combination of query entries.

42. A computer-implemented method of establishing a robot for accessing attributes and/or entities in a data source said method comprising the steps of:

reading the content of the data source according to a retrieving profile;

in response to determining the content of the data source has changed, storing a new retrieving profile according to which attributes of the data source may be retrieved; and establishing a series of processing steps from a set of possible processing steps, said processing steps being adapted to perform a predefined type of data analysis.

43. The method according to claim 42, whereby at least one of said processing steps uses a nodeprocessor.

44. The method according to claim 42, whereby at least one of said processing steps comprises processing a node of a document object model (DOM) tree representing a subset of a data source.

45. The method according to claim 42, whereby at least one of said processing steps comprises outputting a node representing a subset of the data source to another of said processing steps.

46. The method according to claim 42, whereby at least one of said processing steps is adapted to outputting a node representing a subset of the data source to a next processing step among the processing steps, the processing steps being arranged in in a step line.

47. A marketplace web-site embodied on a non-transitory data carrier, the marketplace web-site comprising an input query form or a search tool, said form or search tool comprising a plurality of input query types selected from selections, intervals and numbers; and said marketplace web-site comprising means for:

communicating with at least two data independent sources; and mapping a query established using said input query form or search tool into a number of sub-queries; and at least two of the sub-queries being adapted to access information from at least two corresponding independent data sources.

48. A marketplace web-site embodied on a non-transitory data carrier, the marketplace web-site comprising an input query form or search tool, said form or search tool comprising a plurality of input query types selected from including selections, intervals and numbers, said marketplace web-site comprising means for:

communicating with at least two data independent sources selected from web-sites and relational databases;

storing data extracted from said data sources in a central database; and mapping a query established by means of said input query form or search tool into the database.

* * * * *

UNITED STATES PATENT AND TRADEMARK OFFICE
CERTIFICATE OF CORRECTION

PATENT NO. : 9,633,112 B2  
APPLICATION NO. : 13/946684  
DATED : April 25, 2017  
INVENTOR(S) : Andreasen et al.

Page 1 of 1

It is certified that error appears in the above-identified patent and that said Letters Patent is hereby corrected as shown below:

In the Specification

Figure 1:
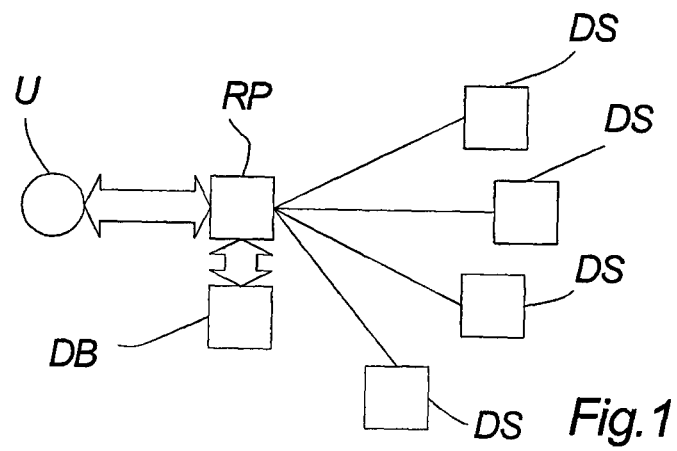
Figure 2:
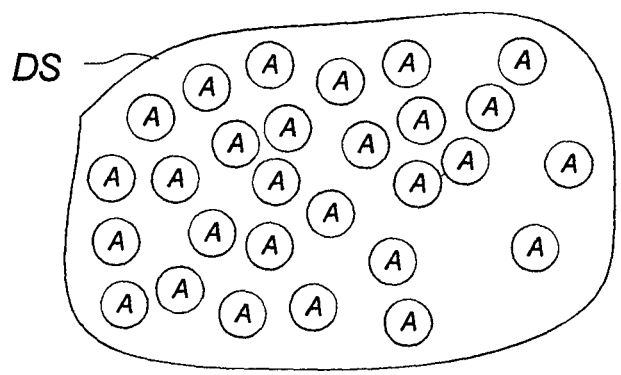
Figure 3:
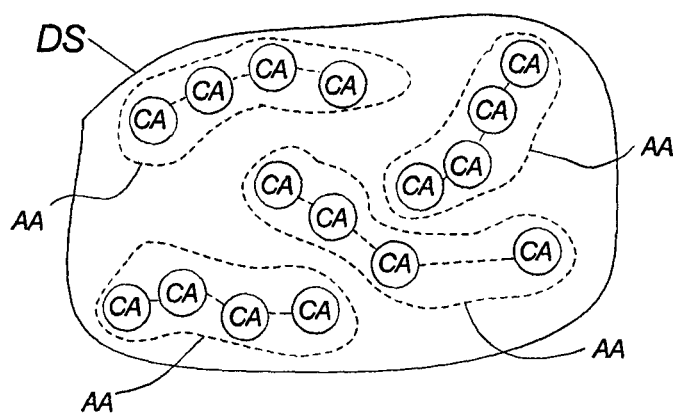
Figure 4A:
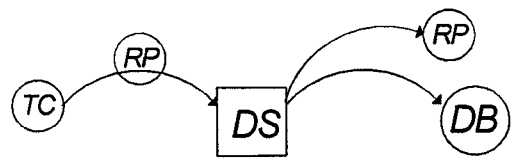
Figure 4B:
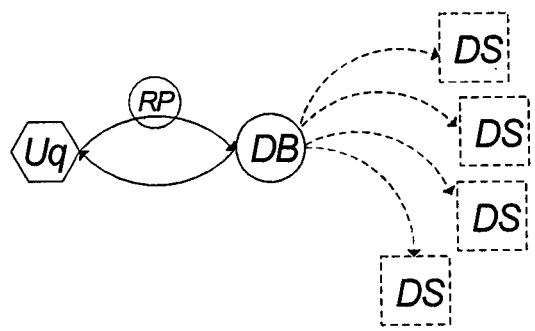
Figure 4C:
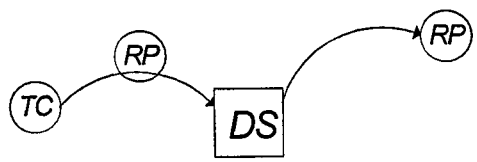
Figure 4D:
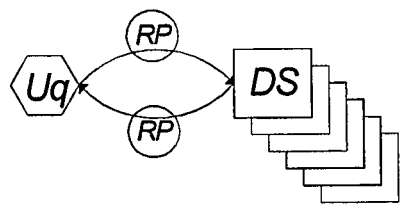
Figure 5:
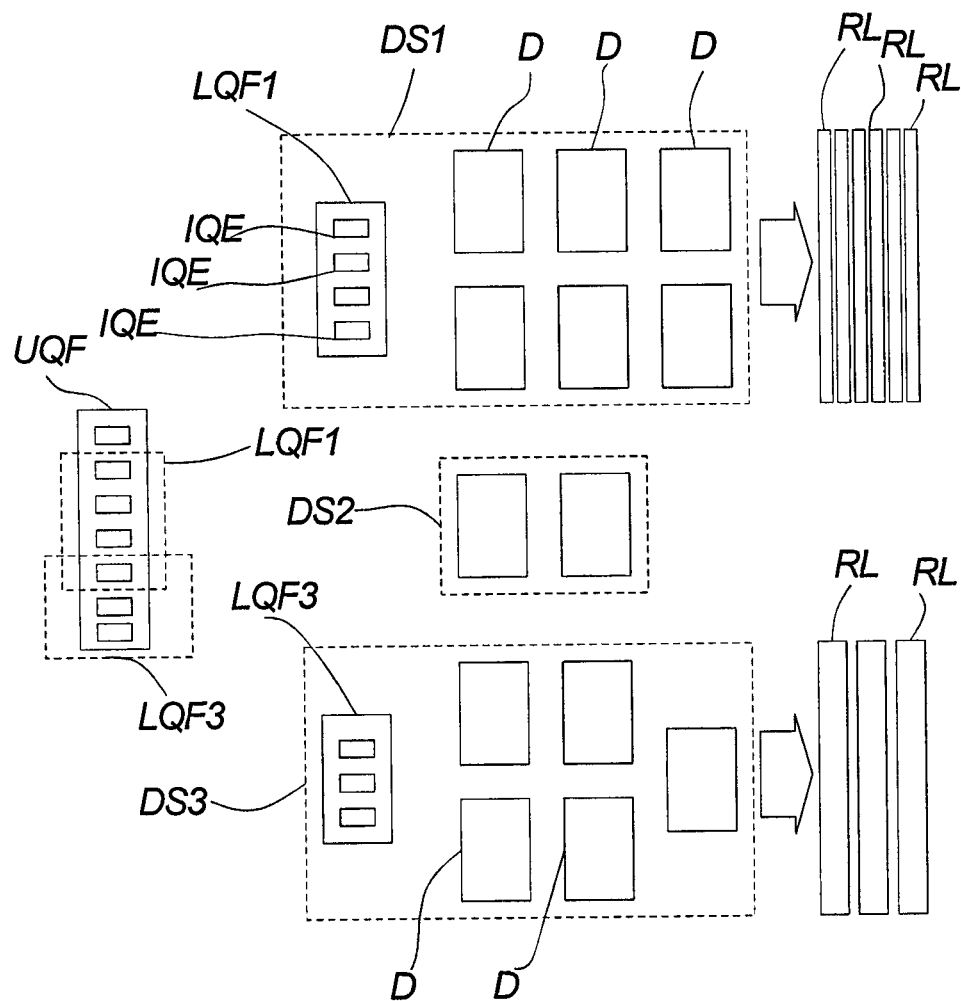
Figure 6A:
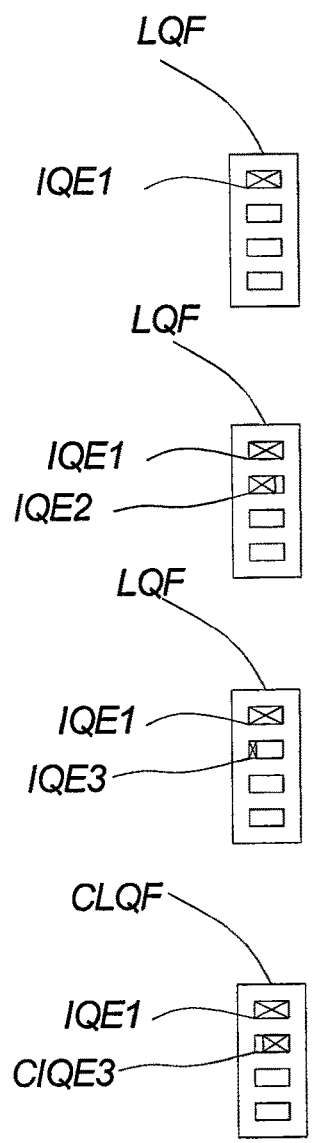
Figure 6A:
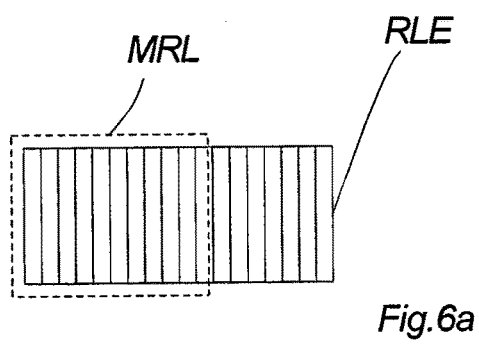
Figure 6B:
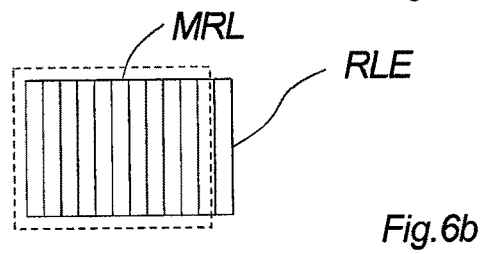
Figure 6C:
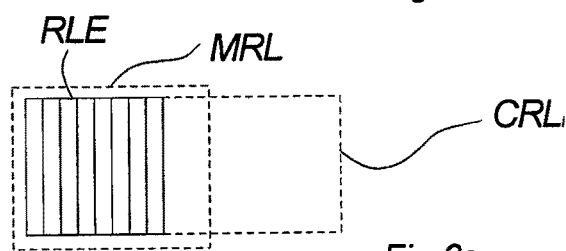
Figure 6D:
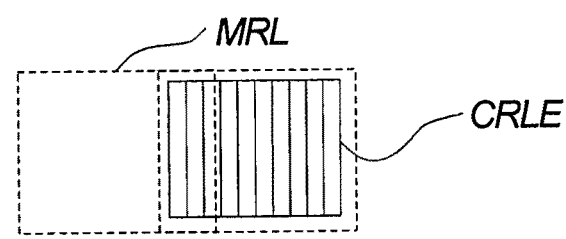
Figure 7:
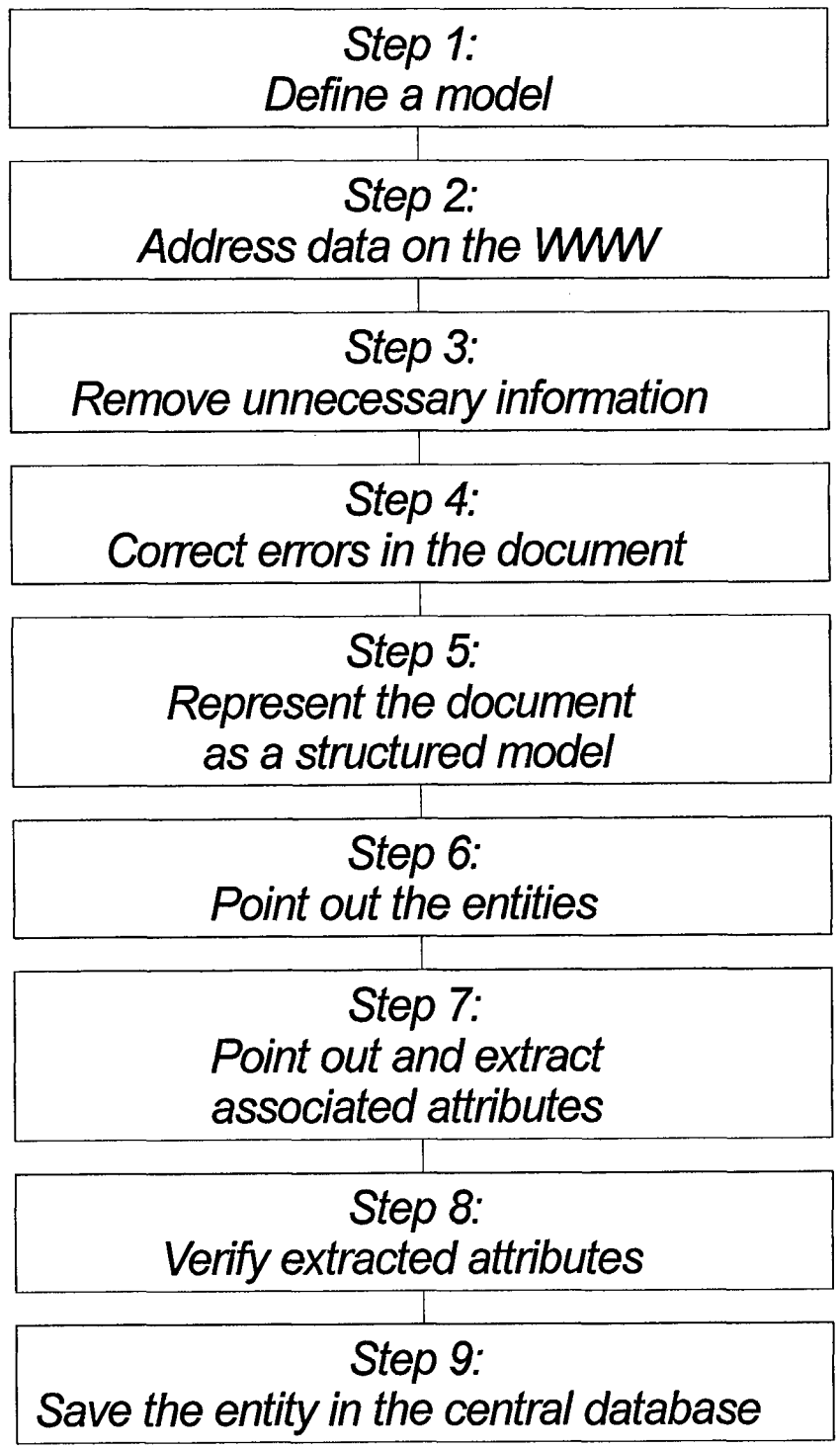

Column 17, Line 63 please replace "A possible breakdown" with --Turning now to FIG. 6e, a possible breakdown--.

Signed and Sealed this
Seventeenth Day of April, 2018

Andrei Iancu
*Director of the United States Patent and Trademark Office*